United States Patent [19]

Love

[11] Patent Number: 4,879,868
[45] Date of Patent: Nov. 14, 1989

[54] REVERSER FOR HARVESTING APPARATUS

[75] Inventor: Mahlon L. Love, Geneseo, Ill.

[73] Assignee: Deere & Company, Moline, Ill.

[21] Appl. No.: 197,473

[22] Filed: May 23, 1988

[51] Int. Cl.[4] .......................................... A01D 69/08
[52] U.S. Cl. ..................................... 56/11.2; 56/11.7
[58] Field of Search .................... 56/11.2, 11.5, 11.7, 56/11.8, 10.2, 13.5; 74/376; 192/51

[56] References Cited

U.S. PATENT DOCUMENTS

| | | | |
|---|---|---|---|
| 2,694,281 | 11/1954 | Beck | 56/11.2 |
| 3,670,590 | 6/1972 | Long et al. | 56/11.2 X |
| 3,945,175 | 3/1976 | Barkstrom et al. | 56/11.2 X |
| 4,046,022 | 9/1977 | Henderson | 74/220 |
| 4,049,207 | 9/1977 | Storm et al. | 241/101.7 |
| 4,138,837 | 2/1979 | Love | 56/11.2 |
| 4,218,864 | 8/1980 | Allemeeroch et al. | 56/11.2 |
| 4,430,847 | 2/1984 | Tourdot et al. | 56/11.7 X |
| 4,467,590 | 8/1984 | Musser et al. | 56/11.2 |
| 4,663,919 | 5/1987 | Stroh et al. | 56/11.2 |

Primary Examiner—Hoang C. Dang

[57] ABSTRACT

A feeder house for an agricultural combine is provided with a driving element that can be reciprocated along the main drive shaft of the feeder house to selectively engage a main driven sheave or a second driven sheave in response to its positioning by the operator. The driving element is provided with internal splines for operatively coupling the output of the main driven sheave to the feeder house drive shaft and is also provided with an outwardly extending gear that is used to engage a cooperating tooth assembly on the second driven sheave for reversing the feeder house drive shaft. The main driven sheave is free to rotate on the feeder house main drive shaft when not being engaged by the driving element. Similarly, the second driven sheave is free to rotate on an axle when not being engaged by the gear extending from the driving element.

16 Claims, 3 Drawing Sheets

4,879,868

REVERSER FOR HARVESTING APPARATUS

BACKGROUND OF THE INVENTION

1. Field of the Invention

The invention is directed to a reverser for a feeder house of a harvesting apparatus. The apparatus is particularly well adapted for use in combines for small grain.

2. Description of the Prior Art

Typically, agricultural combines are provided with an outwardly extending feeder house for directing harvested crop from a harvesting platform into the combine. In difficult crop conditions, it is possible to plug the feeder house by the harvested grain. As such, some assembly is needed to free the plug such as those disclosed in U.S. Pat. No. 4,138,837, and 4,663,919, both assigned to the assignee of the present application.

Summary of the Invention

The present invention provides a simplified reverser assembly that can be used to reverse the feeder house used for transmitting small grains into the combine. The invention comprises a second driven sheave and drive sheave that are located parallel to the main drive and driven sheaves of the feeder house. The main driven sheave is rotatingly received on feeder house drive shaft. The main driven sheave is also provided with an externally toothed cooperating assembly which is selectively engaged by an internally splined drive element that can be moved along the drive shaft. The drive shaft is provided with external splines which cooperate with the internal splines of the drive element so that when the drive element is operably coupled to the toothed cooperating assembly of the main driven sheave, the main driven sheave drives the drive shaft. The drive element is also provided with a gear assembly that can be operatively coupled to a toothed cooperating assembly located on the second driven sheave. By sliding the driven element away from the main driven sheave, the drive element disengages the toothed cooperating assembly of the main driven sheave and the second toothed element engages the toothedcooperating assembly of the second driven sheave. Therefore, the main driven sheave becomes operatively disengaged from the drive shaft and the second driven sheave now drives the drive shaft.

The main driven sheave and the second drive sheave are driven by the same cross shaft and are each provided with V-belts for operatively coupling the drive sheaves of the cross shaft to the driven sheaves. The second driven sheave is rotatably mounted on an idler arm and rotates in the same direction as the main driven sheave. By coupling the second tooth assembly to the tooth cooperating assembly on the second driven sheave, the output is effectively reversed, reversing the rotation of the feeder house drive shaft.

DETAILED DESCRIPTION OF THE PREFERRED EMBODIMENT

Figure 1:
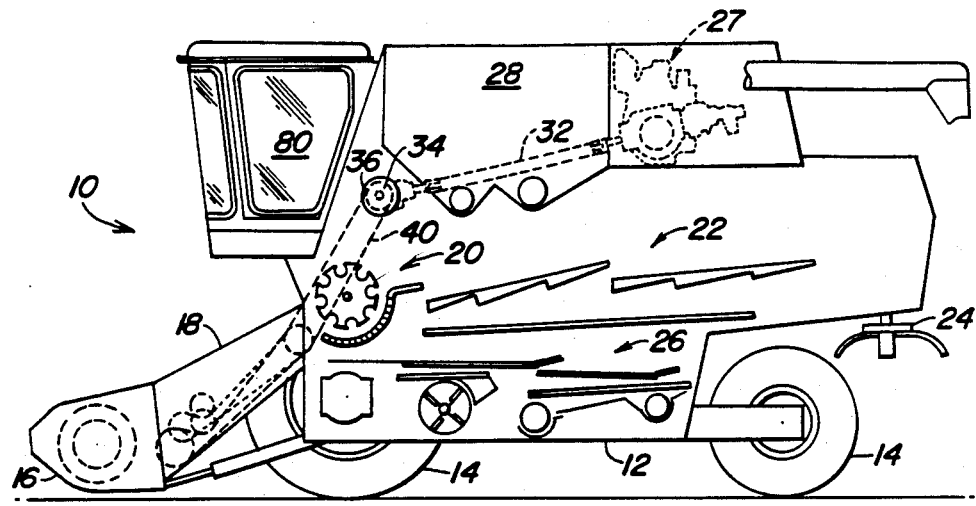
FIG. 1 is a schematic side elevational view of a combine embodying the invention.
Figure 3:
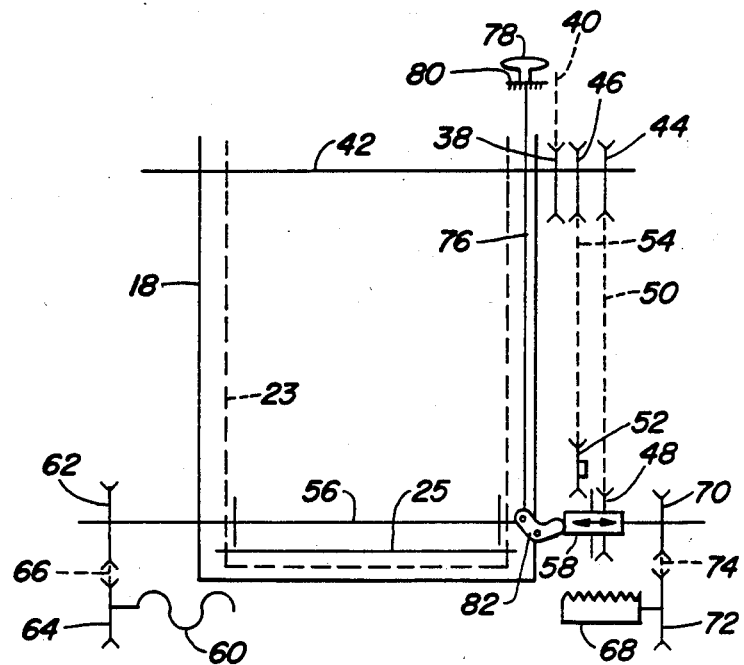
FIG. 3 is a side view of the feeder house drive assemblies.

FIG. 1 illustrates an agricultural combine 10 having a frame 12 that is supported by ground engaging wheels 14. An agricultural crop is harvested by harvesting assembly 16 and transmitted therefrom through feeder house 18 to threshing assembly 20. The threshing assembly threshes the harvested agricultural crop and directs it to separating assembly 22 where the grain is separated from the straw and the straw is directed to the straw chopper 24. Grain and chaff from the separating means is directed to cleaning assembly 26 which separates the chaff from the grain directing the chaff out the rear of the combine. Clean grain conveyor transports the clean grain to grain tank 28 where it is temporarily stored. The various agricultural processing assemblies are driven by engine 27, their operational connections to the engine are best described in U.S. Patent Application, Ser. No. 050,972 filed 15 May 1987, which is incorporated herein by reference.

The feeder house typically comprises a housing in which is located feeder conveyor 23 which comprises a series of chains that are provided with cross bars 25 for transmitting the grain up along the base of the feeder house into the threshing cylinder. Internal combustion engine 27 directs power through forwardly inclined drive shaft 32 to cross shaft 34 which is provided with sheave 36. Sheave 36 is operatively coupled to sheave 38 by belt 40. Driven sheave 38 is operatively coupled to feeder house cross shaft 42. Also mounted on cross shaft 42 are feeder house main drive sheave 44 and second drive sheave 46. The main drive sheave is coupled to main driven sheave 48 by belt 50 whereas second drive sheave 46 is operatively coupled to second driven sheave 52 by second drive belt 54.

The outputs of the two driven sheaves are selectively coupled to feeder house drive shaft 56 by driving element 58. Feeder house drive shaft 56 is used to power header auger assembly 60 through drive sheave 62, driven sheave 64 and belt 66. In addition, feeder house drive shaft 56 powers the reciprocating knife 68 of the header assembly through knife drive sheave 70, knife driven sheave 72 and belt 74.

Figure 2:
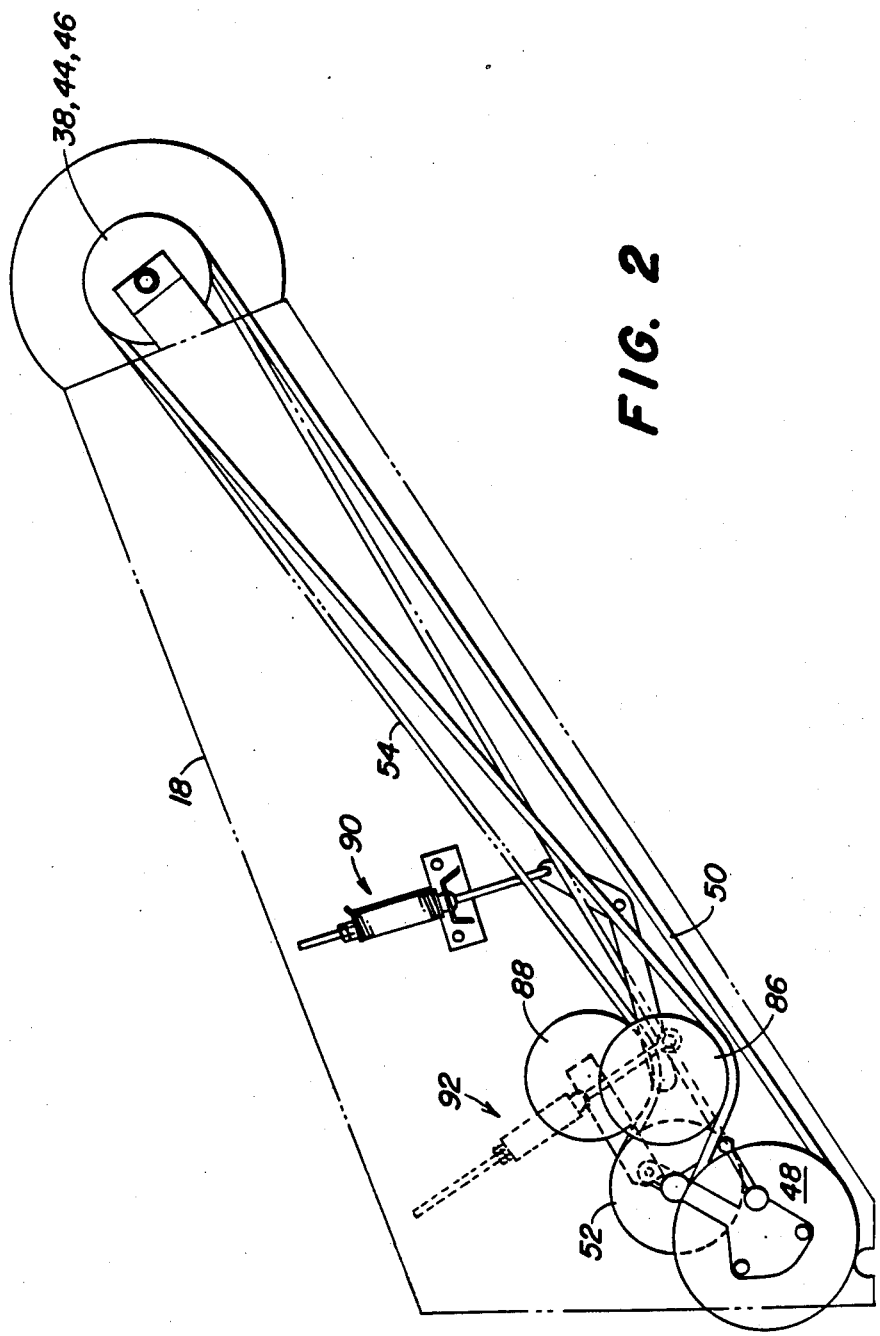
FIG. 2 is a schematic of the feeder house drive assemblies.

Driving element 58 selectively couples the output of main driven sheave 48 and second driven sheave 52 to main drive shaft 56. The positioning of the driving element is controlled by push/pull cable 76 having handle 78 located in operator's cab 80 of the combine. The push/pull cable is operatively coupled to bell crank 82 that is coupled to driving element 58 by link 84. As illustrated in FIG. 2, both drive belt 50 and drive belt 54 are provided with idler belt tensioning sheaves 86 and 88, respectively, each having spring tensioning assemblies 90 and 92, respectively.

Figure 4:
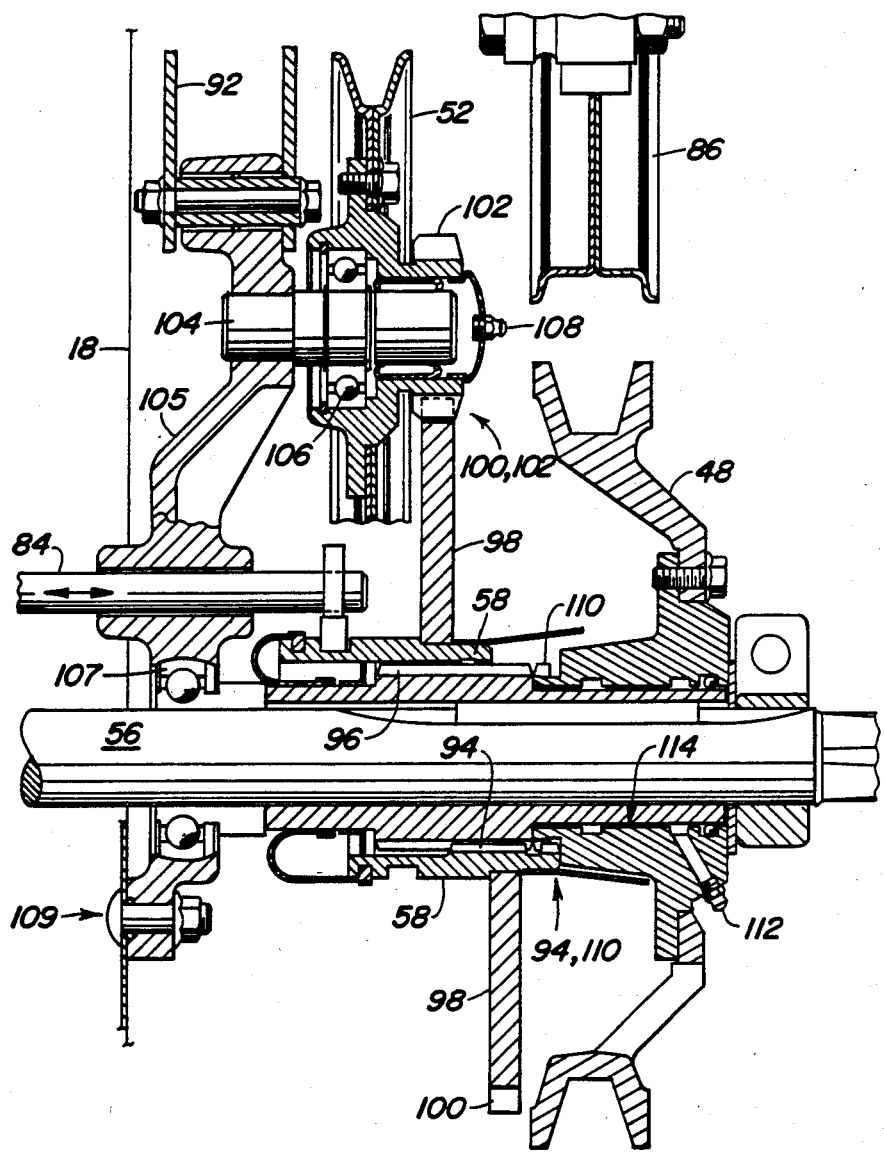
FIG. 4 is a cross sectional view of the reverser assembly.

As illustrated in FIG. 4, driving element 58 is cylindrical member that fits over main drive shaft 56. The driving element is provided with internal splines 94 that are used to engage external spline assembly 96 that is keyed to the feeder house drive shaft. Attached to the exterior of the driving element is gear 98 having toothed assembly 100 which is used to engage cooperating toothed assembly 102 of second driven sheave 52. The second driven sheave is rotatingly mounted on axle 104 by bearing assembly 106 which is lubricated through grease fitting 108. Axle 104 extends from mounting assembly 105 which is rotatingly mounted on drive shaft 56 by bearing assembly 107. To prevent rotation of the mounting assembly, it is pinned to the feederhouse housing at 109.

In FIG. 4, the main drive shaft is divided along a central longitudinal axis to illustrate the driving element being engaged to the second driven sheave or the main driven sheave. The main drive sheave is provided with a cooperating toothed assembly 110 that is engaged by the internal splines of driving element 58, as shown at the bottom of FIG. 4. This is the normal configuration of the drive element when the feeder house is being driven in the forward direction. However, when the feeder house needs to be reversed to remove a plug of grain, the driving element is shifted to the left by link 84 so that gear 98 engages cooperating tooth assembly 102 thereby reversing the direction of the main drive shaft.

As illustrated in FIG. 4, the main driven sheave 48 is rotatably mounted on feeder house drive shaft 56 and is free to rotate thereon when not engaged by the driving element. The main driven sheave 48 is also provided with grease fitting 112 and bearing assembly 114 to insure its free rotation.

The cooperating teeth and splines of the engagement assemblies are beveled so that they can slide easily into each other when operating the reverser mechanism. In operation, feeder house cross shaft 42 is being constantly rotated by sheave 38 and in turn driven sheaves 48 and 52. As such, both driven sheaves are driven in the same direction and is only gear 96 that reverses the rotation of the drive shaft to its engagement with drive element 58.

The invention should not be limited to the above described embodiment, but should be limited solely to the claims that follow.

I claim:

1. In a mobile agricultural machine having a crop processing unit, a feeding unit for transporting a crop to the processing unit, and a power source on the machine for driving the units, the combination therewith of an improved drive system for the feeding unit, comprising:
   a first drive sheave drivingly connected to the power source;
   a first driven sheave;
   a first drive belt drivingly trained around the first drive sheave and the first driven sheave;
   a second drive sheave drivingly connected to the power source;
   a second driven sheave;
   a second drive belt drivingly trained around the second drive sheave and the second driven sheave;
   a transmission having an input selectively connected to the first driven sheave and the second driven sheave and an output drivingly connected to the feeding unit and including a driving element selectively shiftable between a forward position and a reverse position so that for a given driving direction of the input, the driving direction of the output is reversed and the feeding unit is driven in forward and reverse directions respectively, and
   control means for shifting the driving element of the transmission between its forward and reverse positions.

2. The invention as defined by claim 1 wherein the driving element is provided with a first toothed assembly, and the first driven sheave is provided with a first cooperating assembly for engaging the first toothed assembly of the driving element when it is shifted into its forward position.

3. The invention as defined by claim 1 wherein the driving element is provided with a gear having a second toothed assembly, and the second driven sheave is provided with a second cooperating assembly for engaging the second toothed assembly of the driving element when it is shifted into its reverse position.

4. The invention as defined by claim 3 wherein the feeding unit is provided with a splined drive shaft, and the driving element is provided with a third toothed assembly which engages the splined drive shaft for driving the drive shaft in a forward direction when the driving element is shifted to its forward position and in the reverse direction when the driving element is shifted to its reverse direction.

5. The invention as defined by claim 4 wherein the first driven sheave is free to rotate on the drive shaft and the second driven sheave is free to rotate on an axle that extends from a mounting assembly that is rotatingly mounted to the drive shaft and pinned to the feeding unit.

6. The invention as defined by claim 5 wherein the control means comprises a push/pull cable and a bell crank, the push/pull cable is controlled by an operator of the agricultural machine which pivots the bell crank, the bell crank is operatively coupled to the driving element for positioning the driving element in either the forward position or the reverse position.

7. The invention as defined by claim 6 wherein the first and second drive sheaves are coupled to a drive shaft which is rotated by the power source.

8. The invention as defined by claim 7 wherein the first drive sheave drives the first driven sheave in the forward direction and the second drive sheave drives the second driven sheave in the forward direction.

9. In the invention as defined by claim 8 further comprising a gathering unit for gathering an agricultural crop, and the output shaft of the transmission is drivingly connected to the gathering unit.

10. A feeder house for an agricultural machine comprising:
   a housing having an inlet and an outlet through which an agricultural crop passes;
   a conveyor assembly located in the housing for transporting an agricultural crop therethrough;
   a cross shaft extending from the housing;
   a first drive sheave mounted on the cross shaft;
   a second drive sheave mounted on the cross shaft;
   a main drive shaft extending through the feeder house which is operably coupled to the conveyor assembly;
   a first driven sheave rotatingly mounted on the main drive shaft;
   a driving element slidingly received on the main drive shaft and selectively shiftable between a forward position and a reverse position;
   an axle extending outwardly from the housing;
   a second driven sheave rotatingly mounted on the axle;
   a first drive belt drivingly trained around the first drive sheave and the first driven sheave;
   a second drive belt drivingly trained around the second drive sheave and the second driven sheave; and
   a control means for selectively shifting the driving element between the forward or reverse positions, the driving element being provided with assemblies for selectively coupling the first and second driven sheaves to the drive shaft.

11. The invention as defined by claim 10 wherein the driving element is provided with a gear having a second toothed assembly, and the second driven sheave is provided with a second cooperating assembly for engaging the second toothed assembly of the gear when the driving element is shifting into its reverse position.

12. The invention as defined by claim 11 wherein the driving element is provided with a first toothed assembly and the first driven sheave is provided with a first cooperating assembly for engaging the first toothed assembly of the driving element when it is shifted into its forward position.

13. The invention as defined by claim 12 wherein the main drive shaft is provided with an external spline which cooperates with an internal spline of the driving element for driving the drive shaft in the forward direction when the driving element is shifted to its forward position and in the reverse direction when the driving element is shifted to its reverse position.

14. The invention as defined by claim 13 wherein the first driven sheave is free to rotate on the drive shaft and the second driven sheave is free to rotate on the axle, the axle extending from a mounting assembly that is rotatingly mounted to the drive shaft and pinned to the housing.

15. The invention as defined by claim 14 wherein the control means further comprises a push/pull cable and a bell crank, the push/pull cable is used to pivot the bell crank which is operatively coupled to the driving element for positioning the driving element in either the forward or reverse position.

16. The invention as defined by claim 15 wherein the first drive sheave drives the first driven sheave in the forward direction and the second drive sheave drives the second driven sheave in the forward direction.

* * * * *